(12) United States Patent
Tofighbakhsh

(10) Patent No.: US 11,604,837 B2
(45) Date of Patent: Mar. 14, 2023

(54) EDGE METADATA

(71) Applicant: AT&T INTELLECTUAL PROPERTY I, L.P., Atlanta, GA (US)

(72) Inventor: Mostafa Tofighbakhsh, Cupertino, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 716 days.

(21) Appl. No.: 16/106,976

(22) Filed: Aug. 21, 2018

(65) Prior Publication Data

US 2020/0065427 A1 Feb. 27, 2020

(51) Int. Cl.
*G06F 16/907* (2019.01)
*G06K 9/62* (2022.01)
*H04L 9/32* (2006.01)
*G06N 20/00* (2019.01)

(52) U.S. Cl.
CPC ......... *G06F 16/907* (2019.01); *G06K 9/6267* (2013.01); *G06N 20/00* (2019.01); *H04L 9/3213* (2013.01)

(58) Field of Classification Search
CPC .................................................. G06F 16/907
USPC .......................................................... 707/736
See application file for complete search history.

(56) References Cited

U.S. PATENT DOCUMENTS

| | | | |
|---|---|---|---|
| 9,571,405 B2 | 2/2017 | Pignataro et al. | |
| 9,634,929 B2 | 4/2017 | Boutros et al. | |
| 9,984,330 B2 | 5/2018 | Veeragavan et al. | |
| 9,990,587 B2 | 6/2018 | Okanohara et al. | |
| 2010/0223287 A1* | 9/2010 | Lim | H04L 63/20 707/769 |
| 2010/0293174 A1* | 11/2010 | Bennett | G06F 16/353 707/769 |
| 2011/0040754 A1* | 2/2011 | Peto | G06F 16/51 707/736 |
| 2013/0183952 A1* | 7/2013 | Davis | G06T 1/0064 455/418 |
| 2013/0204710 A1* | 8/2013 | Boland | G06Q 30/0241 705/14.66 |
| 2015/0220615 A1* | 8/2015 | Wexler | G06F 16/23 707/740 |
| 2016/0217388 A1* | 7/2016 | Okanohara | G06N 20/00 |
| 2016/0234184 A1* | 8/2016 | Liu | G06F 16/683 |
| 2017/0093753 A1* | 3/2017 | Summers | H04L 47/72 |
| 2017/0344854 A1* | 11/2017 | Behringer | G06K 9/00624 |
| 2018/0091468 A1 | 3/2018 | Yong et al. | |

* cited by examiner

*Primary Examiner* — Muluemebet Gurmu

(57) ABSTRACT

In one embodiment, a method includes receiving, by a storage device located at an edge of a network, user device data from a first user device and receiving, by the storage device, metadata associated with an environment of the first user device. The method also includes classifying, by the storage device, the metadata into a category to generate classified metadata and applying, by the storage device, a policy to the classified metadata to generate policy-based classified metadata. The method further includes assigning, by the storage device, one or more tokens to the policy-based classified metadata and assigning, by the storage device, one or more tags to the policy-based classified metadata. The method further includes transmitting, by the storage device, the one or more tags to a second user device in accordance with the one or more tokens.

20 Claims, 4 Drawing Sheets

EDGE METADATA

TECHNICAL FIELD

This disclosure generally relates to metadata, and more specifically to edge metadata.

BACKGROUND

Users of mobile devices often take photos and videos as they visit new places. The mobile device users may want to learn more about the places they are visiting and share that information with friends and family. While certain information is captured by the photos and videos taken by the users, other information about the surrounding locality of the place the user is visiting is lost.

SUMMARY

According to an embodiment, a method includes receiving, by a storage device located at an edge of a network, user device data from a first user device and receiving, by the storage device, metadata associated with an environment of the first user device. The method also includes classifying, by the storage device, the metadata into a category to generate classified metadata and applying, by the storage device, a policy to the classified metadata to generate policy-based classified metadata. The method further includes assigning, by the storage device, one or more tokens to the policy-based classified metadata and assigning, by the storage device, one or more tags to the policy-based classified metadata. The method further includes transmitting, by the storage device, the one or more tags to a second user device in accordance with the one or more tokens.

According to another embodiment, a system includes one or more processors and a memory storing instructions that, when executed by the one or more processors, cause the one or more processors to perform operations including receiving, by a storage device located at an edge of a network, user device data from a first user device and receiving, by the storage device, metadata associated with an environment of the first user device. The operations further include classifying, by the storage device, the metadata into a category to generate classified metadata and applying, by the storage device, a policy to the classified metadata to generate policy-based classified metadata. The operations further include assigning, by the storage device, one or more tokens to the policy-based classified metadata and assigning, by the storage device, one or more tags to the policy-based classified metadata. The operations further include transmitting, by the storage device, the one or more tags to a second user device in accordance with the one or more tokens.

According to yet another embodiment, one or more computer-readable storage media embody instructions that, when executed by a processor, cause the processor to perform operations including receiving, by a storage device located at an edge of a network, user device data from a first user device and receiving, by the storage device, metadata associated with an environment of the first user device. The operations further include classifying, by the storage device, the metadata into a category to generate classified metadata and applying, by the storage device, a policy to the classified metadata to generate policy-based classified metadata. The operations further include assigning, by the storage device, one or more tokens to the policy-based classified metadata and assigning, by the storage device, one or more tags to the policy-based classified metadata. The operations further include transmitting, by the storage device, the one or more tags to a second user device in accordance with the one or more tokens.

Technical advantages of this disclosure may include one or more of the following. By capturing metadata at the edge of a network, an entity (e.g., a service provider) that owns the captured metadata becomes aware of what people collectively think, do, and are interested in at various locations. The historical aggregated metadata may help an entity with additional revenue models such as capitalizing on grouped and localized interests. The edge metadata can be used to create a grouped social exchange about cities and/or people. The edge metadata can be added to data such as photos and videos captured by mobile users to improve the quantitative aspects of the captured data. By adding additional context to the captured data, mobile users may be provided with opportunities to learn about their surrounding environments. For example, the metadata may alert the mobile users of security risks associated with their surrounding environments.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

To assist in understanding the present disclosure, reference is now made to the following description taken in conjunction with the accompanying drawings, in which.

DETAILED DESCRIPTION

While a mobile user can take pictures, capture video, and share audio with friends and family, the additional information surrounding the photos, video, or audio is lost. This disclosure provides a method for capturing metadata at an edge of a network and processing the metadata to enable users (e.g., mobile device users) to share information about the people, culture, and businesses within their locality beyond what is captured in the pictures, video, and audio. The metadata may be structured into an edge of a network and tagged for consumption. The collective metadata may be aggregated from various sources such as crowdsourcing by advertisers and local events from news agencies. The metadata may become a real-time representation of multiple network edges that may be consumed by several users. This disclosure discusses methods and systems to provide users the option to have an edge cloud service tag their shared content with metadata.

An appliance, such as a solid state drive (SSD) array at an edge of a network, may be utilized to continuously structure metadata. A machine learning engine of the appliance may act as a real-time inference engine to capture localized metadata in real time and process the localized metadata. The processed metadata, which may include information about live events, is delivered to user devices. Users of the user devices may provide authorization to share personalized data such as the user's location or mobility state. The localized metadata and the personalized data may be shared during a conversation between users of the user devices or through data sharing. For example, a child may share a video with her mother. The metadata, which may include context about the captured video such as the location where the video was captured, the time of day the video was captured, and local events occurring when the video was captured, may be tagged with a pointer such that the child and/or mother can click on the pointer and receive the metadata. As another example, metadata associated with an environment may be presented in a dashboard and shared with authorized user devices located in that environment.

Figure 1:
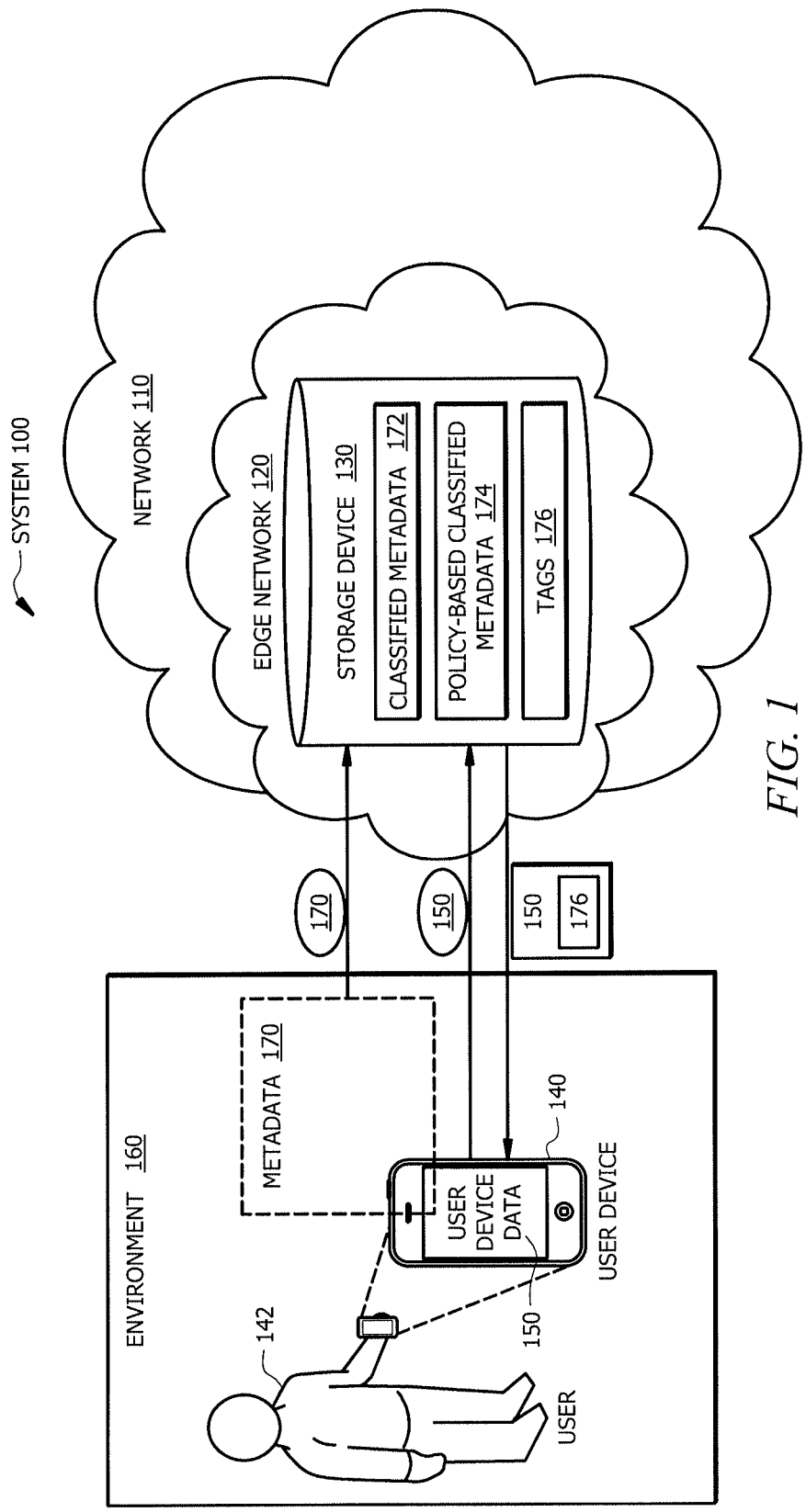
FIG. 1 illustrates an example system for processing metadata.
Figure 2:
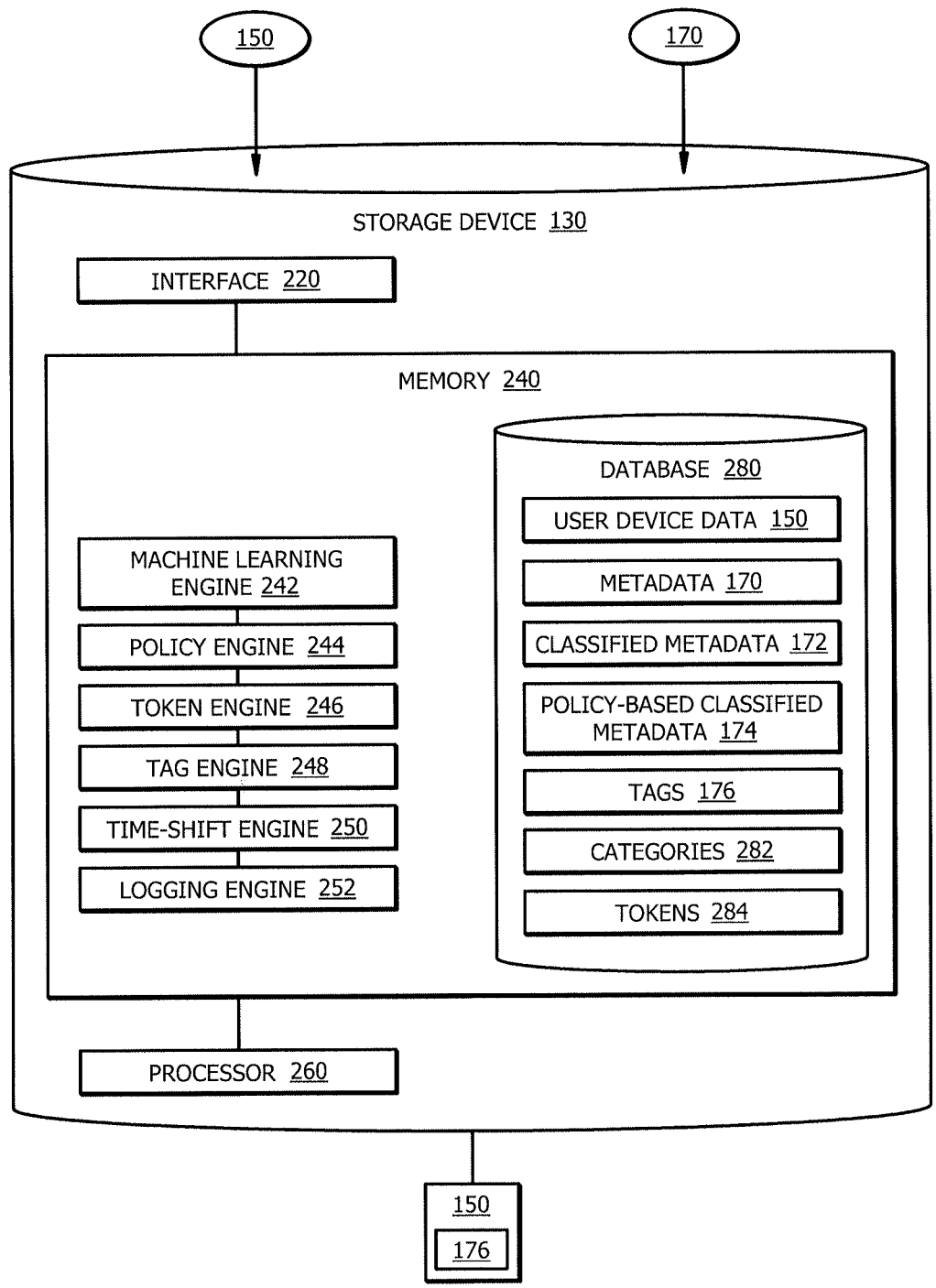
FIG. 2 illustrates an example storage device that may be used by the system of FIG. 1.
Figure 3:
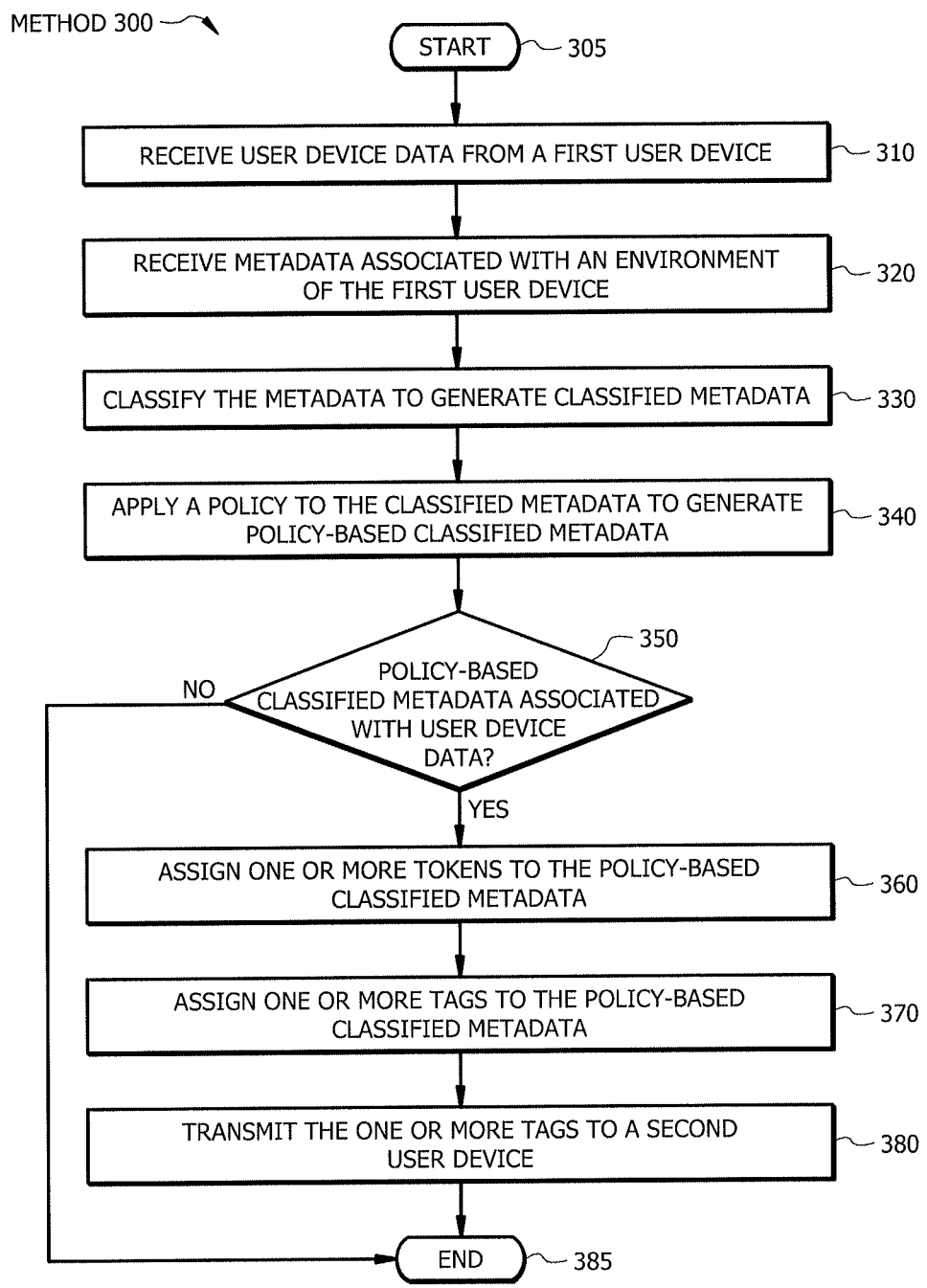
FIG. 3 illustrates an example method for processing metadata that may be used by the system of FIG. 1.
Figure 4:
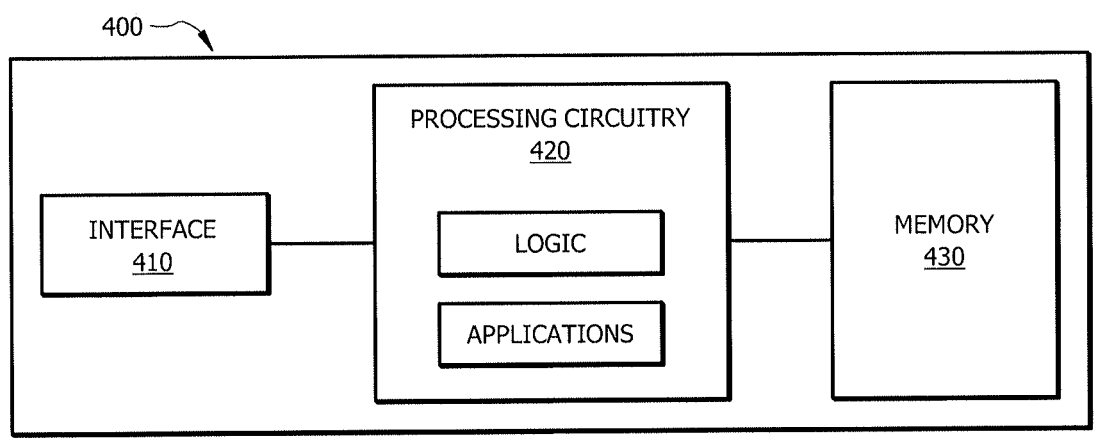
FIG. 4 illustrates an example computer system that may be used by the systems and methods described herein.

FIGS. 1 through 4 show example systems and methods for processing metadata. FIG. 1 shows an example system for processing metadata and FIG. 2 shows an example storage device that may be used by the system of FIG. 1. FIG. 3 shows an example method for processing metadata that may be used by the system of FIG. 1. FIG. 4 shows an example computer system that may be used by the systems and methods described herein.

FIG. 1 illustrates an example system 100 for processing metadata. System 100 of FIG. 1 includes a network 110, an edge network 120, a storage device 130, a user device 140, user device data 150, an environment 160, and metadata 170. Storage device 130 includes classified metadata 172, policy-based classified metadata 174, and tags 176. One or more components of system 100 may have machine learning capabilities. System 100 or portions thereof may be associated with an entity, which may include any entity, such as a business or company, that processes metadata. The elements of system 100 may be implemented using any suitable combination of hardware, firmware, and software.

Network 110 may be any type of network that facilitates communication between components of system 100. Network 110 may connect storage device 130 and user device 140 of system 100. Although this disclosure shows network 110 as being a particular kind of network, this disclosure contemplates any suitable network. One or more portions of network 110 may include software-defined networking (SDN) technology. One or more portions of network 110 may include an ad-hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a combination of two or more of these, or other suitable types of networks. Network 110 may include one or more networks. Network 110 may be any communications network, such as a private network, a public network, a connection through the Internet, a mobile network, a WI-FI network, etc. One or more components of system 100 may communicate over network 110. For example, storage device 130 may communicate over network 110, including receiving information from user device 140 and transmitting information to user device 140. Network 110 may be associated with an entity such as a service provider.

Network 110 may include a core network and edge network 120. Edge network 120 connects directly to user devices 140. Edge network 120 connects one or more user devices 140 to the core network of network 110. One or more portions of network 110 may include SDN technology. Edge network 120 may include equipment such as switches, routers, routing switches, Integrated Access Devices, base stations, radio network controllers, and MAN/WAN devices. Network 110 may be a service provider's network such that routers of edge network 120 communicate with routers on the premises of one or more customers of the service provider. In the illustrated embodiment of FIG. 1, edge network 120 includes storage device 130.

Storage device 130 of system 100 represents a device that can receive, process, create, store, and/or transmit information. Storage device 130 may receive user device data 150 from user device 140. Storage device 130 may receive metadata 170 from user device 140 and/or environment 160. A machine learning component of storage device 130 may classify received metadata 170 into one or more categories to generate classified metadata 172. Storage device 130 may apply one or more policies to classified metadata 172 to generate policy-based classified metadata 174. Storage device 130 may assign one or more tags 176 to policy-based classified metadata 174 and transmit tags 176 to user device 140 in accordance with the one or more tokens. Storage device 130 may be an SSD array. The machine learning component, classified metadata 172, policy-based classified metadata 174, and tags 176 of storage device 130 are described in more detail in FIG. 2 below.

User device 140 of system 100 may be any computing device that provides a mechanism to view and interact with information received from one or more components (e.g., storage device 130) of system 100. In certain embodiments, user device 140 includes a graphical user interface (GUI) that can display information. User device 140 may be a smartphone, desktop computer, laptop computer, tablet computer, virtual reality device, artificial intelligence device, personal digital assistant (PDA), or any other suitable device. User device 140 may include functionality for determining its location, direction, or orientation, such as a Global Positioning System (GPS) receiver, compass, gyroscope, or accelerometer. User device 140 may include functionality for wireless communication, such as BLUETOOTH communication, near-field communication (NFC), or infrared (IR) communication or communication with a WLAN or cellular-telephone network. User device 140 may include one or more cameras, scanners, touchscreens, microphones, or speakers. User device 140 may also execute software applications such as web browsers or social-networking applications.

User 142 may be any operator of user device 140. User 142 may utilize user device 140 to communicate with storage device 130 over network 110. In certain embodiments, user 142 of user device 140 is authorized by an entity (e.g., a telecommunications service provider) associated with system 100 to communicate with storage device 130. In certain embodiments, user 142 may be requested to enter an identification associated with the entity associated with system 100 to access storage device 130. User 142 may capture user device data 150 using user device 140. One more users 142 may specify user preferences for content to be displayed on user device 140. For example, the user preferences of user 142 may include weather conditions and security information such that policy-based classified metadata 174 classified as weather conditions and security information are displayed on user device 140. User 142 may interact with policy-based classified metadata 174 displayed on user device 140. For example, user 142 may select tag 176 by tapping tag 176 on a GUI of user device 140 to access policy-based classified metadata 174.

User device data 150 is any data that is captured by user device 140. User device data 150 may include one or more photos, videos, voice memos, communications between multiple users 142 (e.g., phone conversations, instant messaging, or text conversations), articles, information obtained from advertisers through crowdsourcing, information about local events, live news obtained from news agencies, and the like. User 142 of user device 140 may utilize user device 140 to capture user device data 150 (e.g., a photo or video) associated with environment 160 surrounding user device 140.

Environment 160 is the surroundings and/or conditions in which user device 140 operates. Environment 160 may include objects, conditions, and places surrounding user device 140. Environment 160 may include objects surrounding user device 140 such as monuments, signs, police cars, and taxi cabs. Environment 160 may include weather conditions surrounding user device 140 such as temperature, air pressure, humidity, precipitation, wind speed, sunshine, and cloudiness. Environment 160 may include activity surrounding user device 140 such as live concerts, public rallies, and crime. Environment 160 may include places surrounding user device 140 such as parks, restrooms, museums, hotels, restaurants, coffee shops, wineries, and zoos.

Environment 160 may be confined to a predetermined area surrounding user device 140. For example, environment 160 may include an area within a predetermined distance (e.g., 100 feet or 2 miles) from user device 150. The area of environment 160 may dynamically update as user device 140 changes location. For example, if user 142 of user device 140 is walking or driving with user device 140, the area environment 160 may shift in real-time to maintain a pre-determined perimeter around user device 140 while user device 140 is in motion. Environment 160 may be confined to a certain locality. For example, environment 160 may be confined to a neighborhood, district (e.g., an arts district), place (e.g. a school campus), or city.

Metadata 170 is data associated with a particular location. Metadata 170 may be data associated with user device data 150 (e.g., a photo or video taken by user device 140). Metadata 170 may be data associated with environment 160. Metadata 170 may provide information about user device data 150 (e.g., a photo or video taken by user device 140). Metadata may include personalized and/or environmental metadata 170.

Personalized metadata 170 is any data 170 received by storage device 130 from user device 140. Personalized metadata 170 may provide context for user device data 150. Storage device 130 may require authorization from user 142 of user device 140 to retrieve personalized metadata 170 from user device 140. Personalized metadata 170 may be stored on user device 140. Personalized metadata 170 may include a location (e.g., a GPS location) where user device data 150 was captured, a time when user device data 150 was captured, and/or a mobility state (e.g., walking or driving) of user 142 of user device 140 when user device data 150 was captured.

Environmental metadata 170 is any metadata 170 received by storage device 130 from a source other than user device 140. Environmental metadata 170 may be associated with environment 160 of user device 140. Environmental metadata 170 may be retrieved by a machine learning component of storage device 130 from one or more sources. The sources may include one or more user devices (e.g., a smartphone, laptop computer, or tablet computer) other than user device 140, one or more sensors (e.g., a temperature sensor), one or more cameras (e.g., a video camera), one or more networks (e.g., a service provider's network or the Internet), and the like. Environmental metadata 170 may be received by storage device 130 from one or more sources located within environment 160. Storage device 130 may require authorization to retrieve metadata 170 from one or more sources.

Environmental metadata 170 may include information concerning one or more events that has occurred, is occurring, or is scheduled to occur within physical proximity (e.g., within a pre-determined distance) to a location where user device data 150 was captured. For example, environmental metadata 170 may include information about a concert scheduled to occur in environment 160 the evening user device data 150 was captured. Environmental metadata 170 may include information concerning one or more events that has occurred, is occurring, or is scheduled to occur within a temporal proximity (e.g., a pre-determined time window) relative to a time when user device data 150 was captured. For example, environmental metadata 170 may include information concerning crime that occurred in environment 160 within 24 hours prior to a time when user device data 150 was captured. Environmental metadata 170 may include information concerning an environmental condition (e.g., a temperature or a fire) that has occurred, is occurring, or is scheduled to occur in physical proximity to a location where user device data 150 was captured and in temporal proximity to the time when user device data 150 was captured. Environmental metadata 170 may include a warning of an event that may take place in physical proximity to a location where user device data 150 was captured and in temporal proximity to the time when user device data 150 was captured. For example, environmental metadata 170 may include a tornado warning associated with environment 160.

Although FIG. 1 illustrates a particular arrangement of network 110, edge network 120, storage device 130, and user device 140, this disclosure contemplates any suitable arrangement of network 110, edge network 120, storage device 130, and user device 140. Two or more of storage device 130, and user device 140 may be connected to each other directly, bypassing network 110 and/or edge network 120. Two or more of storage device 130 and user device 140 may be physically or logically co-located with each other in whole or in part. Although FIG. 1 illustrates a particular number of networks 110, edge networks 120, storage devices 130, and user devices 140, this disclosure contemplates any suitable number of networks 110, edge networks 120, storage devices 130, and user devices 140. For example, network 110 may include multiple edge networks 120. As another example, edge network 120 may include multiple storage devices 130.

In operation, user 142 of user device 140 captures user device data 150 (e.g., a photo or video of environment 160). Storage device 130 of edge network 120 retrieves user device data 150 from user device 140. Storage device 130 captures personalized metadata 170 from user device 140. Personalized metadata 170 may include a date and time when user device data 150 was captured and a location where user device data 150 was captured. Storage device 130 captures environmental metadata 170 from various sources. Environmental metadata 170 may include information concerning one or more events that has occurred, is occurring, or is scheduled to occur within physical proximity to a location where user device data 150 was captured. Storage device 130 classifies, using a machine learning component, personalized and environmental metadata 170 into one or more categories to generate classified metadata 172. Each category of classified metadata 172 represents a cluster of information that shares characteristics, such as information associated with a particular place (e.g., a school campus). Storage device 130 applies one or more policies to classified metadata 172 to generate policy-based classified metadata 174. If policy-based classified metadata 174 is associated with user device data 150, storage device 130 assigns one or more tags 176 to policy-based classified metadata 174, embeds one or more tags 176 in user device data 150, and transmits user device data 150 with one or more tags 176 to user device 140. User 142 of user device 140 may access policy-based classified metadata 174 by clicking on tags 176.

As such, system 100 of FIG. 1 provides policy-based, classified metadata 170 to users of a network, which provides the users with a comprehensive overview of the localized conditions and events in their surrounding environments.

FIG. 2 illustrates an example storage device 130 that may be used by the system of FIG. 1. Storage device 130 may be an SSD array located in edge network 120. Storage device 130 includes interface 220, memory 240, and processor 260. Memory 240 includes machine learning engine 242, policy engine 244, token engine 246, tag engine 248, time-shift engine 250, logging engine 252, and database 280. Database 280 includes user device data 150, metadata 170, classified metadata 172, policy-based classified metadata 174, tags 176, categories 282, and tokens 284.

Interface 220 of storage device 130 represents any suitable computer element that can receive information from network 110, transmit information through network 110, perform suitable processing of the information, communicate to other components (e.g., user device 140) of system 100, or any combination of the preceding. Interface 220 may receive user device data 150 from user device 140 via edge network 120, for example. Interface 220 may transmit tags 176 embedded in user device data 150 to one or more user devices (e.g., user device 140) via edge network 120, as another example. Interface 220 may transmit policy-based classified metadata 174 to one or more user devices via edge network 120, as still another example. Interface 220 represents any port or connection, real or virtual, including any suitable combination of hardware, firmware, and software, including protocol conversion and data processing capabilities, to communicate through a LAN, a WAN, or other communication system that allows system 100 to exchange information between components of system 100.

Memory 240 of storage device 130 stores, permanently and/or temporarily, received and transmitted information, as well as system software, control software, other software for storage device 130, and a variety of other information. Memory 240 may store information for execution by processor 260. Memory 240 stores machine learning engine 242, policy engine 244, token engine 246, tag engine 248, time-shift engine 250, logging engine 252, and database 280. Memory 240 includes any one or a combination of volatile or non-volatile local or remote devices suitable for storing information. Memory 240 may include Random Access Memory (RAM), Read-only Memory (ROM), magnetic storage devices, optical storage devices, or any other suitable information storage device or a combination of these devices. Memory 240 may include any suitable information for use in the operation of storage device 130. Additionally, memory 240 may be a component external to (or may be partially external to) storage device 130. Memory 240 may be located at any location suitable for memory 240 to communicate with storage device 130.

Processor 260 of storage device 130 controls certain operations of storage device 130 by processing information received from interface 220 and memory 240 or otherwise accessed by processor 260. Processor 260 communicatively couples to interface 220 and memory 240. Processor 260 may include any hardware and/or software that operates to control and process information. Processor 260 may be a programmable logic device, a microcontroller, a microprocessor, any suitable processing device, or any suitable combination of the preceding. Additionally, processor 260 may be a component external to storage device 130. Processor 260 may be located in any location suitable for processor 260 to communicate with storage device 130. Processor 260 controls the operation of machine learning engine 242, policy engine 244, token engine 246, tag engine 248, time-shift engine 250, and logging engine 252.

Machine learning engine 242 of storage device 130 is a computer program that classifies metadata 170 received from user device 140 and/or one or more other sources. Machine learning engine 242 may receive a stream (e.g., a continuous stream) of metadata 170 and run inference in real-time to classify metadata 170. Inference refers to machine learning engine 242's ability to infer information about metadata 170 based on training. For example, machine learning engine 242 may recognize objects or words spoken or written within metadata 170 or suggest alerts (e.g., security alerts) based on metadata 170. Machine learning engine 242 may calculate and learn metadata 170 through decision trees. Machine learning engine 242 may receive personalized metadata 170, such as a date and time when user device data 150 was captured and a location where user device data 150 was captured, from user device 140 and classify personalized metadata 170 into one or more categories 282. Machine learning engine 242 may capture environmental metadata 170, such as information concerning one or more events that has occurred, is occurring, or is scheduled to occur within physical proximity to a location where user device data 150 was captured, from various sources (e.g., the Internet or a service provider's network) and classify environmental metadata 170 into one or more categories 282.

Machine learning engine 242 may classify metadata 170 using graph rules (e.g., graph algorithms) that describe policies. For example, machine learning engine 242 may classify metadata 170 (e.g., a data packet) that is received from a specific group-zone, is within a pre-determined size constraint (e.g., less than 1500 bytes), and is within a pre-determined inter-arrival rate (e.g., 15 milliseconds) into one or more categories 282. The graph rules may be written into a set of primitive building blocks by a machine learning trainer and/or manually configured into a set of matrices. Machine learning engine 242 may extract information from metadata 170 using pattern recognition. For example, machine learning engine 242 may search metadata 170 for one or more matches of a pre-determined search pattern. Machine learning engine 242 may use one or more open source platforms to classify metadata 170. For example, machine learning engine 242 may use an open source platform with pattern matching capabilities to perform deep packet inspections.

Each category 282 of classified metadata 172 represents a cluster of classified metadata 172 that shares characteristics. Each category 282 may represent classified metadata 172 associated with an event (e.g., a concert), a place (e.g., a school), a person or a group of persons (e.g., a friend of user 142), a condition (e.g., weather conditions), security information, and the like. Each category 282 may include classified personalized metadata 172, classified environmental data 172, or both. Each category 282 may be associated with an identifier. For example, machine learning engine 242 may assign a tag identifier to metadata 170 upon the classification of metadata 170 into category 282

Policy engine 244 of storage device 130 is a computer program that applies one or more policies to metadata 170. Policy engine 244 may apply one or more policies to metadata 170 to generate classified metadata 172, as an example. Policy engine 244 may apply one or more policies to classified metadata 172 to generate policy-based classified metadata 174, as another example. Policies are decisions that policy engine 244 calculates to achieve a desired outcome. The policies may include one or more triggers that initiate actions to metadata 170 and/or classified metadata 172 when an event occurs. For example, a trigger may be the generation of classified metadata 172 and the trigger may initiate an application of an algorithm to classified metadata 172 upon the generation of classified metadata 172. Policy engine 244 may apply policies to classified metadata 172 in accordance with one or more identifiers assigned to classified metadata 172. For example, policy engine 244 may apply a first set of policies to classified metadata 172 associated with a first identifier and apply a second set of policies to classified metadata associated with a second identifier. Policy engine 244 may have machine learning capabilities. Policy engine 244 may be a component of machine learning engine 242.

Policy engine 244 may determine whether policy-based classified metadata 174 is associated with user device data 150. For example, policy-based classified metadata 174 may include current weather conditions of environment 160, and policy engine 244 may determine that the weather conditions affect the area where user device data 150 (e.g., a phone conversation) was captured. Policy engine 244 may determine whether policy-based classified metadata 174 is associated with user preferences. For example, policy-based classified metadata 174 may include current weather conditions of environment 160, and policy engine 244 may determine that the user preferences of the recipient of policy-based classified metadata 174 do not include weather conditions.

Each policy is determined by an administrator of storage device 130 and pre-loaded into storage device 130. Policy engine 244 may use decision trees to generate policy-based classified metadata 174. Policies may be user-specific. For example, policy engine 244 may apply a first set of policies for a first user (e.g., user 142) and a second set of policies for a second user.

Token engine 246 of storage device 130 is a computer program that generates one or more tokens 284. Each token 284 is an object that represents a right to perform an operation. Token engine 246 may assign one or more tokens 284 to policy-based classified metadata 174 to assist storage device 130 with post-processing operations and delivery controls. Tokens 284 may be credit-based to assist token engine 246 with managing the frequency of the delivery of policy-based classified metadata 174. For example, tokens 284 assigned to policy-based classified metadata 174 may be decremented and/or incremented upon delivery of policy-based classified metadata 174. Tokens 284 may be in the form of tags used to label policy-based classified metadata 174.

Tokens 284 of token engine 246 may instruct storage device 130 where to transmit policy-based classified metadata 174. For example, token 284 may instruct storage device 130 to transmit policy-based classified metadata 174 to a user device (e.g., user device 140 of FIG. 1). Tokens 284 of token engine 246 may instruct storage device 130 when to transmit policy-based classified metadata 174 to the user device. For example, token 284 may instruct storage device 130 to transmit policy-based classified metadata 174 at a pre-determined time of day. As another example, token 284 may instruct storage device 130 to transmit policy-based classified metadata 174 to a user device in accordance with a pre-determined schedule (e.g., hourly, daily, or weekly). Tokens 284 of token engine 246 may instruct storage device 130 how to transmit policy-based classified metadata 174 to a user device. For example, token 284 may instruct storage device 130 to transmit policy-based classified metadata 174 to a user device only after authenticating the recipient of policy-based classified metadata 174. As another example, token 284 may instruct storage device 130 to transmit policy-based classified metadata 174 (e.g., a security alert) to a user device in the form of an aural alarm (e.g., a siren sound) or visual alarm (e.g., a red danger sign).

Tag engine 248 of storage device 130 is a computer program that generates one or more tags 176. Tags 176 are labels used to identify policy-based classified metadata 174. Tags 176 may be attached (e.g., embedded) in user device data 150. Tags 176 may include a keyword (e.g., "TIME"), an image (e.g., a clock image), or an identifying mark (e.g., an arrow).

Tag engine 248 may assign one or more tags 176 to policy-based classified metadata 174. For example, policy-based classified metadata 174 may represent a time of day when user device data 150 was captured, and tag engine 248 may assign tag 176 represented by a clock image to policy-based classified metadata 174. Tag engine 248 may assign one or more tags 176 to policy-based classified metadata 174 based on one or more identifiers associated with policy-based classified metadata 174. For example, tag engine 248 may assign the same tag 176 to policy-based classified metadata 174 associated with the particular identifier that represents a particular category 282. Tag engine 248 may embed one or more tags 176 within other data, such as user device data 150, a map of environment 160, or a dashboard (e.g., a smartphone dashboard or a vehicle dashboard). User device data 150 may be a photo or video taken by a child at the child's school, and tag engine 248 may embed tag 176 in the photo or video, as an example. Tag engine 248 may embed one or more tags 176 within a map on user device 140, as another example. Tag engine 248 may embed one or more tags 176 within a dashboard on user device 140, as another example.

Tag engine 248 may embed multiple tags 176 in user device data 150. For example, tag engine 248 may embed the following tags 176 in user device data 150: tag 176 representing a location where user device data 150 was captured; tag 176 representing a time when user device data 150 was captured; tag 176 representing an event occurring in physical proximity to the location where user device data 150 was captured and in temporal proximity to the time when user device data 150 was captured.

Time-shift engine 250 of storage device 130 is a computer program that delays the transfer of information. Time-shift engine 250 may delay reception of metadata 170 by storage device 130. Time-shift engine 250 may delay delivery of policy-based classified metadata 174 from storage device 130. Time-shift engine 250 may delay the transfer of information (e.g., metadata 170 or policy-based classified metadata 174) based on one or more pre-determined schedules. The pre-determined schedule may include instructions to deliver the information at certain time intervals (e.g., hourly, weekly, or bi-monthly). The pre-determined schedule may include instructions to deliver the information on certain dates (e.g., the first day of each month). For example, a first user device (e.g., user device 140 of FIG. 1) may belong to a child, and a second user device may belong to the child's mother. The pre-determined schedule may include instructions specified (e.g., selected) by the child's mother to deliver policy-based classified metadata 174 to the child's mother on a daily basis at a certain time. Time-shift engine 250 may delay delivery of policy-based classified metadata 174 to the second user device in accordance with the pre-determined schedule.

Logging engine 252 records the activity performed by storage device 130. For example, logging engine 252 may record each time storage device 130 delivers policy-based classified metadata 174 to a user device (e.g., user device 140). Logging engine 252 may record the activity performed by storage device 130 in any suitable form, such as a log file or a blockchain. Storage device 130 may utilize the recorded activity for historical purposes, such as to analyze trends.

Database 280 is any component that can store data associated with system 100. Database 280 may store certain types of information for network 110. Database 280 may be a single database or may include multiple databases. Database 280 stores user device data 150, metadata 170, classified metadata 172, policy-based classified metadata 174, tags 176, categories 282, and tokens 284. Database 280 includes any one or a combination of volatile or non-volatile local or remote devices suitable for storing information. Database 280 may include RAM, ROM, magnetic storage devices, optical storage devices, or any other suitable information storage device or a combination of these devices. Although database 280 is shown in storage device 130 of FIG. 1, database 280 may be located in any location suitable for communication with storage device 130. Database 280 may be externally located from storage device 130. Although described as a database, database 280 may be implemented as any suitable type of volatile or non-volatile memory. Database 280 may include one or more interfaces and/or processors.

FIG. 3 shows an example method for processing metadata 170 that may be used by the system of FIG. 1. Method 300 begins at step 305. At step 310, storage device 130 of FIG. 1 receives user device data 150 from a first user device (e.g., user device 140 of FIG. 1). User device data 150 may represent a photo, a video, or a voice memo captured by user 142 of user device 140 or a conversation between user 142 of user device 140 and a second user of a second user device.

At step 320, storage device 130 receives metadata 170 associated with environment 160 of user device 140. Storage device 130 may receive metadata 170 in real-time. Alternatively, storage device 130 may receive metadata 170 in accordance with a time-shift schedule. Storage device 130 may receive metadata 170 from a user device in environment 160. For example, storage device 130 may receive personal metadata 170 from user device 140. As another example, storage device 130 may receive environmental metadata 170 from a source other than user device 140, such as a service provider's network, a camera, or a sensor. Metadata 170 may represent a location where the user device data was captured, a time when the user device data was captured, and information concerning one or more events occurring in physical proximity to the location where user device data 150 was captured and in temporal proximity to the time when user device data 150 was captured.

At step 330, storage device 130 classifies metadata 170 to generate classified metadata 172. Machine learning engine 242 of storage device 130 may run inference in real-time to classify metadata 170 into one or more categories 282. Each category 282 of classified metadata 172 represents a cluster of classified metadata 172 that shares characteristics, such as information associated with an event, a place, a person or a group of persons, a condition, security information, and the like.

At step 340, storage device 130 applies one or more policies to classified metadata 172 to generate policy-based classified metadata 174. At step 350, storage device 130 determines whether policy-based classified metadata 174 is associated with user device data 150. If policy-based classified metadata 174 is not associated with user device data 150, method 300 advances to step 385, where method 300 ends. If policy-based classified metadata 174 is associated with user device data 150, method 300 moves to step 360, where storage device 130 assigns one or more tokens 284 of FIG. 2 to policy-based classified metadata 174. Tokens 284 may instruct storage device 130 to transmit policy-based classified metadata 174 to a user device (e.g., a second user device), when to transmit policy-based classified metadata 174 to the user device, and how to transmit policy-based classified metadata 174 to the second user device.

At step 370, storage device 130 (e.g., tag engine 248 of storage device 130) assigns one or more tags 176 to policy-based classified metadata 176. Tags 176 are labels used to identify policy-based classified metadata 174. Tags 176 may be one or more keywords, images, or identifying marks. Storage device 130 may embed tags 176 in user device data 150, on a map of environment 160, or in a dashboard (e.g., a smartphone dashboard or a vehicle dashboard).

At step 380, storage device 130 transmits one or more tags 176 to a second user device in accordance with one or more tokens 284. For example, storage device 130 may transmit tags 176 embedded in user device data 150 to the second user device. Storage device 130 may transmit one or more tags 176 to the second user device in accordance with a time-shift schedule such that delivery of tags 176 is delayed. The first user device of step 310 and the second user device of step 380 may be the same device or different devices. Method 300 then advances to step 385, where method 300 ends.

Modifications, additions, or omissions may be made to method 300 depicted in FIG. 3. Method 300 may include more, fewer, or other steps. For example, method 300 may include transmitting classified metadata 172 to a user device. As another example, method 300 may include logging each time policy-based classified metadata 174 is transmitted to a user device. Steps may also be performed in parallel or in any suitable order. While discussed as specific components completing the steps of method 300, any suitable component of system 100 may perform any step of method 300.

FIG. 4 shows an example computer system that may be used by the systems and methods described herein. For example, storage device 130 and/or user device 140 of FIG. 1 may include one or more interface(s) 410, processing circuitry 420, memory(ies) 430, and/or other suitable element(s). Interface 410 (e.g., interface 220 of FIG. 2) receives input, sends output, processes the input and/or output, and/or performs other suitable operation. Interface 410 may comprise hardware and/or software.

Processing circuitry 420 (e.g., processor 260 of FIG. 2) performs or manages the operations of the component. Processing circuitry 420 may include hardware and/or software. Examples of a processing circuitry include one or more computers, one or more microprocessors, one or more applications, etc. In certain embodiments, processing circuitry 420 executes logic (e.g., instructions) to perform actions (e.g., operations), such as generating output from input. The logic executed by processing circuitry 420 may be encoded in one or more tangible, non-transitory computer readable media (such as memory 430). For example, the logic may comprise a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory 430 (or memory unit) stores information. Memory 430 (e.g., memory 240 of FIG. 2) may comprise one or more non-transitory, tangible, computer-readable, and/or computer-executable storage media. Examples of memory 430 include computer memory (for example, RAM or ROM), mass storage media (for example, a hard disk), removable storage media (for example, a Compact Disk (CD) or a Digital Video Disk (DVD)), database and/or network storage (for example, a server), and/or other computer-readable medium.

Herein, a computer-readable non-transitory storage medium or media may include one or more semiconductor-based or other integrated circuits (ICs) (such as field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (STORAGE DEVICEs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method, comprising:
receiving, by a storage device located at an edge of a network, user device data from a first user device, wherein the user device data comprises data captured by the first user device;
receiving, by the storage device, metadata associated with an environment of the first user device from a source other than the first user device or the storage device;
classifying, by the storage device, the metadata into a category to generate classified metadata;
applying, by the storage device, a policy to the classified metadata to generate policy-based classified metadata;
assigning, by the storage device, one or more tokens to the policy-based classified metadata, wherein the one or more tokens identify how to transmit the policy-based classified metadata to a second user device, wherein the how to transmit the policy-based classified metadata to the second user device specifies an operation to be performed before the transmitting can occur or a modality in which to transmit the policy-based classified metadata to the second user device;
assigning, by the storage device, one or more tags to the policy-based classified metadata; and
transmitting, by the storage device, the one or more tags to the second user device in accordance with the one or more tokens.

2. The method of claim 1, wherein:
the user device data comprises one or more of the following:
a photo;
a video; or
a voice memo;
the metadata comprises one or more of the following:
a location where the user device data was captured;
a time when the user device data was captured; or
one or more events occurring within a pre-determined distance to the location where the user device data was captured and within a pre-determined time window around the time when the user device data was captured.

3. The method of claim 1, wherein:
receiving the metadata comprises receiving the metadata by a machine learning engine of the storage device; and
classifying the metadata comprises classifying the metadata into the category to generate the classified metadata by the machine learning engine of the storage device.

4. The method of claim 1, wherein:
the first user device is different from the second user device; and
the policy is selected by a user of the second user device.

5. The method of claim 1, wherein:
receiving the metadata occurs according to a first time-shift schedule; and
transmitting the one or more tags to the second user device occurs according to a second time-shift schedule.

6. The method of claim 1, further comprising embedding, by the storage device, the one or more tags in the user device data, wherein the one or more tags comprise one or more of the following:

a keyword;
an image; or
an identifying mark.

7. A system comprising one or more processors of a storage device located at an edge of a network and a memory storing instructions that, when executed by the one or more processors, cause the one or more processors to perform operations, the operations comprising:
receiving user device data from a first user device, wherein the user device data comprises data captured by the first user device;
receiving metadata associated with an environment of the first user device from a source other than the first user device or the storage device;
classifying the metadata into a category to generate classified metadata;
applying a policy to the classified metadata to generate policy-based classified metadata;
assigning one or more tokens to the policy-based classified metadata, wherein the one or more tokens identify how to transmit the policy-based classified metadata to a second user device, wherein the how to transmit the policy-based classified metadata to the second user device specifies an operation to be performed before the transmitting can occur or a modality in which to transmit the policy-based classified metadata to the second user device;
assigning one or more tags to the policy-based classified metadata; and
transmitting the one or more tags to the second user device in accordance with the one or more tokens.

8. The system of claim 7, wherein:
the user device data comprises one or more of the following:
a photo;
a video; or
a voice memo;
the metadata comprises one or more of the following:
a location where the user device data was captured;
a time when the user device data was captured; or
one or more events occurring within a pre-determined distance to the location where the user device data was captured and within a pre-determined time window around the time when the user device data was captured.

9. The system of claim 7, wherein a machine learning engine of the storage device:
receives the metadata; and
classifies the metadata into the category to generate the classified metadata.

10. The system of claim 7, wherein:
the first user device is different from the second user device; and
the policy is selected by a user of the second user device.

11. The system of claim 7, wherein:
receiving the metadata occurs according to a first time-shift schedule; and
transmitting the one or more tags to the second user device occurs according to a second time-shift schedule.

12. The system of claim 7, wherein the operations further comprise embedding the one or more tags in the user device data, wherein the one or more tags comprise one or more of the following:
a keyword;
an image; or
an identifying mark.

13. One or more non-transitory computer-readable storage media embodying instructions that, when executed by a processor of a storage device located at an edge of a network, cause the processor to perform operations, the operations comprising:
receiving user device data from a first user device, wherein the user device data comprises data captured by the first user device;
receiving metadata associated with an environment of the first user device from a source other than the first user device or the storage device;
classifying the metadata into a category to generate classified metadata;
applying a policy to the classified metadata to generate policy-based classified metadata;
assigning one or more tokens to the policy-based classified metadata, wherein the one or more tokens identify how to transmit the policy-based classified metadata to a second user device, wherein the how to transmit the policy-based classified metadata to the second user device specifies an operation to be performed before the transmitting can occur or a modality in which to transmit the policy-based classified metadata to the second user device;
assigning one or more tags to the policy-based classified metadata; and
transmitting the one or more tags to the second user device in accordance with the one or more tokens.

14. The one or more non-transitory computer-readable storage media of claim 13, wherein:
the user device data comprises one or more of the following:
a photo;
a video; or
a voice memo;
the metadata comprises one or more of the following:
a location where the user device data was captured;
a time when the user device data was captured; or
one or more events occurring within a pre-determined distance to the location where the user device data was captured and within a pre-determined time window around the time when the user device data was captured.

15. The one or more non-transitory computer-readable storage media of claim 13, wherein a machine learning engine of the storage device:
receives the metadata associated with the user device data; and
classifies the metadata into the category to generate the classified metadata.

16. The one or more non-transitory computer-readable storage media of claim 13, wherein:
the first user device is different from the second user device; and
the policy is selected by a user of the second user device.

17. The one or more non-transitory computer-readable storage media of claim 13, wherein:
receiving the metadata occurs according to a first time-shift schedule; and
transmitting the one or more tags to the second user device occurs according to a second time-shift schedule.

18. The method of claim 1, wherein the operation comprises an authentication of the second user device.

19. The system of claim 7, wherein the operation comprises an authentication of the second user device.

20. The one or more non-transitory computer-readable storage media of claim 13, wherein the operation comprises an authentication of the second user device.

\* \* \* \* \*